(12) United States Patent
Hirata et al.

(10) Patent No.: US 7,558,027 B2
(45) Date of Patent: Jul. 7, 2009

(54) MAGNETIC FIELD SENSOR PROVIDED WITH AN UPPER SHIELD LAYER HAVING PORTIONS WITH DIFFERENT MAGNETOSTRICTION

(75) Inventors: Kei Hirata, Tokyo (JP); Takahiko Machita, Tokyo (JP); Koji Shimazawa, Tokyo (JP); Kiyoshi Noguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 407 days.

(21) Appl. No.: 11/411,107

(22) Filed: Apr. 26, 2006

(65) Prior Publication Data
US 2006/0262457 A1   Nov. 23, 2006

(30) Foreign Application Priority Data
Apr. 27, 2005  (JP) .............................. 2005-129413

(51) Int. Cl.
*G11B 5/127* (2006.01)
(52) U.S. Cl. .................................................. 360/319
(58) Field of Classification Search ................ 360/319; 428/811.4, 811.5
See application file for complete search history.

(56) References Cited

U.S. PATENT DOCUMENTS

| | | | | |
|---|---|---|---|---|
| 5,864,450 A | * | 1/1999 | Chen et al. ................... | 360/319 |
| 6,124,047 A | * | 9/2000 | Hasegawa ................. | 428/811.4 |
| 6,177,207 B1 | * | 1/2001 | Koike ....................... | 428/811.5 |
| 6,292,334 B1 | * | 9/2001 | Koike et al. .................. | 360/319 |
| 7,061,726 B2 | * | 6/2006 | Ohtomo et al. ............. | 360/319 |
| 2003/0086215 A1 | * | 5/2003 | Kief et al. .................... | 360/319 |

FOREIGN PATENT DOCUMENTS

| | | |
|---|---|---|
| JP | 10-302227 | 11/1998 |
| JP | 11-134615 | 5/1999 |
| JP | 11-296818 | 10/1999 |
| JP | 2000-48327 | 2/2000 |

* cited by examiner

*Primary Examiner*—Tianjie Chen
(74) *Attorney, Agent, or Firm*—McGinn IP Law Group, PLLC

(57) ABSTRACT

A magnetic field sensor comprises: a magnetic field detecting element that detects magnitude of an external magnetic field based on electric resistance of the magnetic field detecting element to sense current, the electric resistance being varied in accordance with the external magnetic field; an upper shield layer that is formed to cover the magnetic field detecting element; and a protective layer that is formed above the upper shield layer with respect to a direction of stacking. The upper shield layer includes a first portion at least part of which covers a top surface of the magnetic field detecting element, and a second portion that covers the first portion, and, the first portion has a larger absolute value of magnetostriction than the second portion.

11 Claims, 13 Drawing Sheets

Track Width

MAGNETIC FIELD SENSOR PROVIDED WITH AN UPPER SHIELD LAYER HAVING PORTIONS WITH DIFFERENT MAGNETOSTRICTION

The present application is based on, and claims priority from, J.P. Application No. 2005-129413, filed on Apr. 27, 2005, the disclosure of which is hereby incorporated by reference herein in its entirety.

BACKGROUND OF THE INVENTION

1. Field of the Invention

The present invention relates to a magnetic field sensor, in particular to the structure of an upper shield layer of a magnetic field sensor that utilizes magneto-resistive effect.

2. Description of the Related Art

Development of high density magnetic recording in hard disk drives has almost reached the 100 Gbpsi class on a mass production basis. In order to cope with the tendency toward high density magnetic recording, a magnetic field sensor that uses a magneto-resistive effect, such as a MR (Magneto-Resistive) element, has been used as a magnetic head. In particular, a GMR (Giant Magneto-Resistive) element using a spin valve (SV) film provides a highly sensitive magnetic head because of the large change in electric resistance to sense current that flows through the element in order to read magnetic records in a recording medium. A SV film is stacked films that include a ferromagnetic layer in which the direction of magnetization is fixed in one direction (this layer may also be referred to as a pinned layer hereinbelow), another ferromagnetic layer in which the direction of magnetization varies in accordance with an external magnetic field that is generated by a recording medium (this layer may also be referred to as a free layer), and a non-magnetic space layer disposed therebetween. In an SV film, the direction of magnetization of the free layer creates an angle relative to the direction of magnetization of the pinned layer in accordance with the external magnetic field, so that spin dependent scattering of conduction electrons varies depending on the relative angle, causing a change in magnetoresistance. The magnetic head detects the change in magnetoresistance to read magnetic information from the recording medium.

In an MR element, a free layer causes change in magnetoresistance in response to an external magnetic field, as described above, and in general, a bias magnetic field is applied to an MR element in order to achieve linear change in magnetoresistance and to reduce noise, and thereby to stabilize the output characteristics. In general, bias layers that apply a bias magnetic field are arranged on both sides of an MR element with respect to the track width direction so that the bias magnetic field is applied in the track width direction of the MR element. On the other hand, the external magnetic field is applied in a direction that is parallel to the layers and that is perpendicular to the track width direction. When no external magnetic field is applied, the magnetization of the free layer is oriented in the track width direction. If an external magnetic field is applied, the direction of magnetization turns in accordance with the magnitude of the external magnetic field.

An MR element is covered with shield layers on both sides with respect to the direction of stacking and is magnetically shielded from the surroundings in order to detect only the magnetic field that is generated by a predetermined recording domain on a recording medium. However, actually, the shield layers are magnetized by the surroundings, and as a result, the free layer is affected by the shield layers. The shield layers are magnetized by the external magnetic field that is applied by the recording medium, and are also magnetized due to deformation of the shield layer which is arranged adjacent to the recording head. The deformation is caused by the operation of the recording head. Specifically, heat which is generated through the writing operation of the recording head causes deformation (strain) in the upper shield layer, which in turn changes the magnetic domain structure in the upper shield layer by the inverse magnetostriction effect. The deformation in the upper shield layer that is caused by this effect may also be referred to as external deformation hereinbelow. Magnetization of the upper shield layer that is caused by these effects is unstable because it depends on the magnitude of the external magnetic field or the condition of heating in the coil. Therefore, even if a bias magnetic field is applied, the condition of magnetization of the upper shield layer may vary because of variation in the magnetic domain structure, especially when the latter effect dominates. As a result, the bias magnetic field is disturbed, resulting in difficulty in applying the desired bias magnetic field to the free layer and in achieving stable output characteristics.

In order to cope with the above problems, a technique has been disclosed in Japanese Patent Laid-open Publication No. 2000-48327, in which shield layers have multi-layer structures that are composed of magnetic layers and non-magnetic spacing layers interposed therebetween. Since the directions of the magnetization of the magnetic layers are in anti-parallel with each other via the non-magnetic spacing layers, the formation of a single magnetic domain is promoted, and the shield layer is less affected by the external magnetic field. Further, in order to minimize the disturbance to the magnetization of the upper shield layer that is caused by the external deformation, it is preferable that the magnetostrictive coefficient of the material be as small as possible. For example, $Ni82Fe18$, which has a magnetostrictive coefficient of 0, is used as the material for the upper shield layer.

However, the shield layer in a multi-layer structure which is described in the above patent document needs a complex fabrication process, and this causes an increase in cost. In a multi-layer structure, each layer must be formed such that the magnetic moment cancels each other out so that the layers, as a whole, do not leak magnetic field. However, in practice, it is difficult to perfectly prevent leakage of magnetic field, and therefore, it is also difficult to prevent influence on the free layer. In addition, in an actual element, it is difficult to fabricate an upper shield layer such that it has a magnetostrictive coefficient of 0, and therefore, the magnetostrictive coefficient varies depending on the locations on a wafer on which many MR elements are formed. Since the upper shield layer needs to be formed in a certain thickness to satisfy the functional requirement, even a small variation may result in a large magnitude of magnetization as a whole, causing a serious effect on the MR elements.

SUMMARY OF THE INVENTION

The object of the present invention is to provide a magnetic field sensor which stabilizes the magnetization of the upper shield layer with a simple structure, and thereby stabilizes the output characteristics.

Another object of the present invention is to provide a head gimbal assembly, a hard disk drive, and so on which use such a magnetic field sensor.

According to an embodiment of the present invention, a magnetic field sensor comprises: a magnetic field detecting element that detects magnitude of an external magnetic field based on electric resistance of said magnetic field detecting element to sense current, the electric resistance being varied in accordance with the external magnetic field; an upper shield layer that is formed to cover said magnetic field detecting element; and a protective layer that is formed above said upper shield layer with respect to a direction of stacking. The upper shield layer includes a first portion at least part of which covers a top surface of said magnetic field detecting element, and a second portion that covers said first portion, and, said first portion has a larger absolute value of magnetostriction than said second portion.

The protective layer is deformed in a particular direction when residual in-plane stress in a wafer, which is generated in the manufacturing process of a magnetic field sensor, is released, and the first portion is also forced to be deformed in a particular direction by the protective layer that is deformed. Since the first portion has a larger absolute value of magnetostriction than the second portion, the first portion is anisotropically magnetized due to the inverse magnetostriction effect, and the direction of the magnetization of the first portion is more apt to be fixed. Thus, the first portion is easily magnetized along a particular axis, the direction of which depends on whether the magnetostriction is positive or negative. The first portion bears properties that resemble hard magnetic material, and becomes less apt to be magnetized in random directions by the external magnetic field or by the external deformation. As a result, the magnetic field sensor, which is arranged just under the first portion with respect to the direction of stacking, is also less affected by variation in the external magnetic field, thus leading to stable output characteristics.

The first portion may have a positive value of magnetostriction, and may extend in an approximately same cross section in a height direction of said magnetic field detecting element, and wherein said first portion is formed such that a dimension of said first portion in the height direction ranges between 1.5 times 200 times a dimension of said magnetic field detecting element in a track width direction.

The first portion may also be formed such that the dimension of said first portion in the height direction ranges between 5 times 200 times the dimension of said magnetic field detecting element in the track width direction.

The magnetic field detecting element may be an magneto-resistive element which comprises a first ferromagnetic layer whose direction of magnetization is fixed with respect to the external magnetic field, a non-magnetic layer, and a second ferromagnetic layer whose direction of magnetization varies in accordance with the external magnetic field. The magnetic field detecting element may further comprises: a pair of bias layers for applying a bias magnetic field to said second ferromagnetic layer, said pair of bias layers being arranged on both sides of said magneto-resistive element with respect to the track width direction; a pair of lead electrodes for supplying the sense current to said magneto-resistive element, wherein each of said pair of lead electrodes covers at least a part of the corresponding bias layer; and an upper gap layer that is configured to cover surfaces of said pair of lead electrodes that are opposite to each other and said magneto-resistive element, said upper gap layer forming a recess between said pair of lead electrodes. The first portion may extend in the height direction such that said first portion fills only the recess.

The magnetic field detecting element may be an magneto-resistive element which comprises a first ferromagnetic layer whose direction of magnetization is fixed with respect to the external magnetic field, a non-magnetic layer, and a second ferromagnetic layer whose direction of magnetization varies in accordance with the external magnetic field. The magnetic field detecting element may further comprises: a pair of bias layers for applying a bias magnetic field to said second ferromagnetic layer, said pair of bias layers being arranged on both sides of said magneto-resistive element with respect to the track width direction; and a metal layer that is formed to cover at least a part of the pair of bias layers and said magneto-resistive element. The upper shield layer may supply the sense current to said magneto-resistive element. The first portion may extend above said metal layer from above said magneto-resistive element in the height direction.

The first portion may have a negative magnetostriction value, and may extend in an approximately same cross section in a track width direction of said magnetic field detecting element, and wherein said first portion is formed such that a dimension of said first portion in the track width direction ranges between 1.5 times 200 times a dimension of said magnetic field detecting element in a height direction.

The first portion may be formed such that the dimension of said first portion in the track width direction ranges between 5 times 200 times the dimension of said magnetic field detecting element in the height direction.

The magnetic field detecting element may be an magneto-resistive element which comprises a first ferromagnetic layer whose direction of magnetization is fixed with respect to the external magnetic field, a non-magnetic layer, and a second ferromagnetic layer whose direction of magnetization varies in accordance with the external magnetic field. The magnetic field detecting element may further comprises: a pair of bias layers for applying a bias magnetic field to said second ferromagnetic layer, said pair of bias layers being arranged on both sides of said magneto-resistive element with respect to the track width direction; a pair of lead electrodes for supplying the sense current to said magneto-resistive element, wherein each of said pair of lead electrodes covers at least a part of the corresponding bias layer; and an upper gap layer that is configured to cover surfaces of said pair of lead electrodes that are opposite to each other and said magneto-resistive element, said upper gap layer forming a recess between said pair of lead electrodes. The first portion may extend in the track width direction such that said first portion fills a part of said upper gap layer and a part of said recess.

The magnetic field detecting element may be an magneto-resistive element which comprises a first ferromagnetic layer whose direction of magnetization is fixed with respect to the external magnetic field, a non-magnetic layer, and a second ferromagnetic layer whose direction of magnetization varies in accordance with the external magnetic field. The magnetic field detecting element may further comprises: a pair of bias layers for applying a bias magnetic field to said second ferromagnetic layer, said pair of bias layers being arranged on both sides of said magneto-resistive element with respect to the track width direction; and a metal layer that is formed to cover at least a part of said pair of bias layers and said magneto-resistive element. The upper shield layer may supply the sense current to said magneto-resistive element. The first portion may extend above said metal layer in the track width direction such that said first portion covers a part of one of said pair of bias layers, said magneto-resistive element, and a part of the other of said pair of bias layers.

An absolute value of magnetostrictive coefficient of said first portion may be equal to or greater than $0.5 \times 10^{-6}$.

The first and second portions may essentially consist of any one of nickel, iron, cobalt, or compound containing nickel, iron, or cobalt.

The first and second portions may be composed of same elements having different composition ratios.

As described above, according to the present invention, the upper shield layer is configured to be unsusceptible to variation in magnetization by using both the inverse magnetostriction effect and deformation of the upper shield layer that is caused by deformation of the protective layer. Accordingly, a magnetic field sensor can be provided which stabilizes the magnetization of the upper shield layer with a simple structure, and thereby stabilizes the output characteristics.

The above and other objects, features, and advantages of the present invention will become apparent from the following description with reference to the accompanying drawings which illustrates the present invention.

DETAILED DESCRIPTION OF THE INVENTION

The First Embodiment

Figure 1:
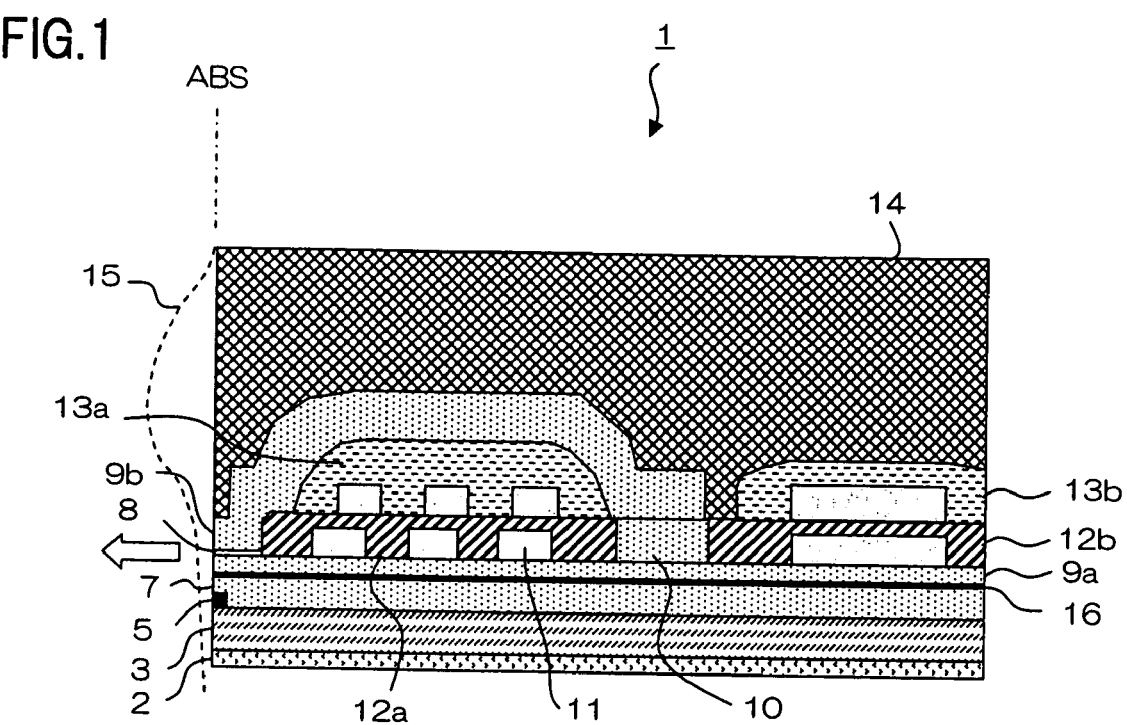
FIG. 1 is a sectional view showing the location near an MR element of a thin-film magnetic head in the first embodiment of the present invention.

The first embodiment of a magnetic field sensor of the present invention will be described in detail with reference to the drawings. FIG. 1 is a partial sectional view of a thin-film magnetic head having a magnetic field sensor of the present invention. Thin-film magnetic head 1 has a substrate, not shown, that is made of ceramic, such as AlTiC ($Al_2O_3$.TiC), and layers beginning from seed layer 2 to protective layer 14 which are stacked in this order, as will be described later.

Specifically, lower shield layer 3 made of perm-alloy (NiFe) is formed on the substrate, with seed layer 2 made of alumina ($Al_2O_3$) interposed therebetween. Lower shield layer 3 functions as a lower magnetic shield layer for the reproducing head, or MR element 5 which functions as a magnetic field detecting element. MR element 5 is formed on lower shield layer 3 on the side of the air bearing surface (ABS), which is the surface of thin-film magnetic head 1 that faces a recording medium, not shown. Upper shield layer 7 is formed on MR element 5, and covers MR element 5. Upper shield layer 7 functions as an upper magnetic shield layer for MR element 5. Lower magnetic pole layer 9a is formed on upper shield layer 7, with non-magnetic layer 16 interposed therebetween. Lower magnetic pole layer 9a functions as a lower magnetic pole layer for the recording head which will be described later. Upper shield layer 7 will be described later in detail.

Upper magnetic pole layer 9b is formed on lower magnetic pole layer 9a, with recording gap 8 for insulation formed therebetween. Recording gap 8 is made of non-magnetic material that can be deposited by sputtering, such as Ru or alumina. Upper magnetic pole layer 9b is made of magnetic material that can be deposited by plating, such as perm-alloy or CoNiFe. Lower magnetic pole layer 9a and upper magnetic pole layer 9b are magnetically coupled by connecting portion 10, forming a U-shaped magnetic body as a whole. Lower magnetic pole layer 9a, recording gap 8, and upper magnetic pole layer 9b form an induction-type magnetic transducer that functions as a recording head.

The recording head may be either of the longitudinal recording type, in which the recording medium is magnetized in a direction parallel to the surface of the medium, or of the perpendicular recording type, in which the recording medium is magnetized in a direction perpendicular to the surface of the recording medium.

Coil 11, which is made of conductive material such as copper, is provided in two layers between lower magnetic pole layer 9a and upper magnetic pole layer 9b and between ABS and connecting portion 10. Coil 11, which has a lot of turns and is integrated into one piece, applies magnetic flux to upper shield layer 7 and to upper magnetic pole layer 9b in order to record information. The number of turns and layers of coil 11 are not limited to the embodiment in the drawing, and may be determined as desired. Coil 11 is insulated by insulating layers 12a, 12b, 13a, 13b that surround coil 11. Protective layer 14, which is made of insulating material, such as alumina, is formed to cover upper magnetic pole layer 9b.

MR element 5 is a magnetic field detecting element that detects the magnitude of an external magnetic field based on electric resistance to sense current, which varies in accordance with external magnetic field. The term 'magnetic field detecting element' means the layers that produce the change in magnetic resistance. The magnetic field detecting element can be applied not only in a spin value film, which is described hereinbelow, but also in an AMR film, a dual spin valve film, as well as in a TMR film, which will be described later.

Figure 2A:
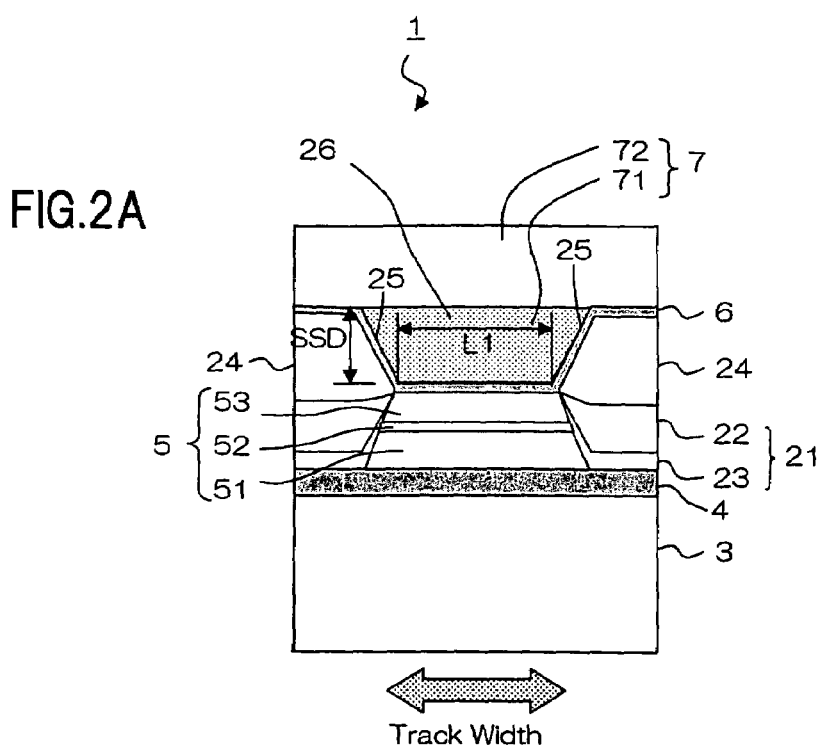
FIG. 2A is a side view showing the thin-film magnetic head shown in FIG. 1, viewed from the air bearing surface.
Figure 2B:
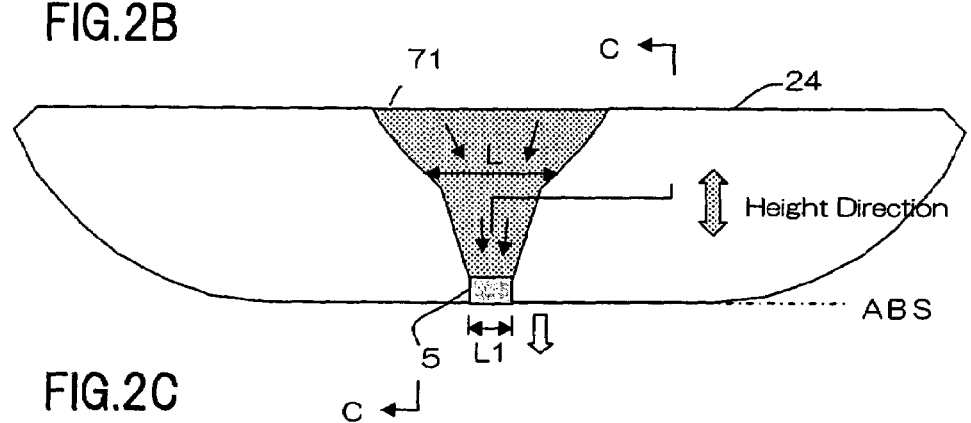
FIG. 2B is a partial plan view showing the location near the MR element and the lead electrodes in the thin-film magnetic head shown in FIG. 2A.
Figure 2C:
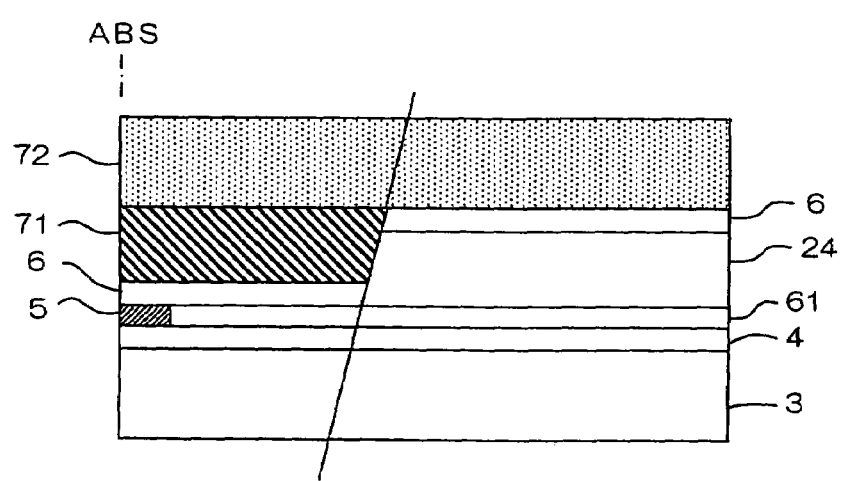
FIG. 2C is a sectional view taken along line C-C in FIG. 2B.

FIG. 2A is a side view of a thin-film magnetic head, viewed from ABS. A recording medium, not shown, extends in a plane that is parallel to the figure and that is on this side of the figure. FIG. 2B is a partial plan view showing the location near the MR element and the lead electrodes, viewed at the elevation of the second portion that will be described hereinbelow. FIG. 2C is a sectional view taken along line C-C in FIG. 2B.

As shown in FIG. 2A, MR element 5 is composed of pinned layer 51, which consists of a first ferromagnetic layer and an antiferromagnetic layer that fixes the magnetization of the first layer; non-magnetic spacing layer 52, and free layer 53 that functions as a second ferromagnetic layer. Pinned layer 51, non-magnetic spacing layer 52, and free layer 53 are stacked in this order. MR element 5 is formed above lower magnetic shield 3, with lower gap layer 4, which is made of, for example, alumina, interposed therebetween.

Pinned layer 51 is a ferromagnetic film whose magnetization direction is fixed in one direction and is not affected by an external magnetic field that is generated by, for example, a recording medium. Pinned layer 51 may be made of ferromagnetic alloy that includes Fe, Co, or Ni as a main component. Pinned layer 51 may also be a synthetic pinned layer (a pinned layer of a stacked structure having a first magnetically pinned layer, a non-magnetic metal layer, and a second magnetically pinned layer which are stacked in this order, with the first pinned layer and the second pinned layer antiferromagnetically coupled). Non-magnetic spacing layer 52 is typically made of Cu. Free layer 53 is a ferromagnetic film that varies in the direction of magnetization in accordance with the external magnetic field that is generated by a recording medium. Free layer 53 is typically made of ferromagnetic alloy that essentially consists of CoFe-based alloy, NiFe-based alloy, or the like.

A pair of bias layers 21 and a pair of lead electrodes 24 are arranged on both sides of MR element 5 with respect to the track width direction. The track width direction means the left-to-right direction in the figure, as shown by the arrow in FIG. 2A. Bias layers 21 apply bias magnetic field to MR element 5 in the track width direction in order to allow the magnetization of free layer 53 to be directed in the track width direction when no external magnetic field is applied from a recording medium. Bias layers 21 may be formed in a single layer that is made of hard magnetic material such as CoCrPt. Alternatively bias layers 21 may be made of soft magnetic layer 22 and antiferromagnetic layer 23 which are stacked in this order, or stacked in the reverse order. Soft magnetic layer 22 may be made of, for example, NiFe, or CoFe.

Antiferromagnetic layer 23 may be made of, for example, IrMn, RuRhMn, or PtMn.

Lead electrodes 24 apply sense current to MR element 5. Lead electrode 24 may be made of, for example, AuCu, and may be covered with protective layers, not shown, consisting of Ta or the like, on the top side and on the bottom side. Lead electrodes 24 have a larger sectional area than MR element 5 in order to decrease electric resistance to a sufficiently low level, and the back side of MR element 5 is filled with insulating layer 61, as shown in FIG. 2C. Accordingly, lead electrodes 24 are formed to a higher elevation than MR element 5 with respect to the direction of stacking.

Upper gap layer 6 is provided between the pair of lead electrodes 24 and upper shield layer 7 in order to provide electric insulation between them.

Upper gap layer 6 may be made of alumina or the like. Since lead electrodes 24 are formed to a higher elevation than MR element 5 with respect to the direction of stacking as explained above, and upper gap layer 6 covers lead electrodes 24 and MR element 5 along their surfaces, recess 26 is formed between opposing surfaces 25 of upper gap layer 6.

Upper gap layer 6 is covered with upper shield layer 7. Upper shield layer 7 has first portion 71 and second portion 72 that covers first portion 71.

At least a part of first portion 71 covers the top of MR element 5. First portion 71 extends such that it only fills recess 26. Specifically, the top surface of first portion 71 and the top surface of upper gap layer 6, which is stacked on lead electrodes 24, are approximately flush with each other, as shown in FIG. 2C. First portion 71 extends such that width L of first portion 71 becomes larger in the track width direction in accordance with the distance from ABS in the height direction, as shown in FIG. 2B. This is because first portion 71 is formed along the surface of lead electrodes 24 having a similar profile. The height direction means the direction that is parallel to the surfaces of the stacked layers and that is perpendicular to ABS.

First and second portions 71, 72 essentially consist of nickel, iron, cobalt, or the compound of nickel, iron, or cobalt, such as perm-alloy (NiFe). First and second portions 71, 72 may further include Mo, Zr, Ta, O, N, S, C, or Nb. First portion 71 has positive magnetostriction with a magnetostrictive coefficient of $0.5 \times 10^{-6}$ or more. The details will be described later. Second portion 72 is formed such that it has smaller magnetostriction than first portion 71, and preferably has a value of 0 or a value that is close to 0.

Figure 3:
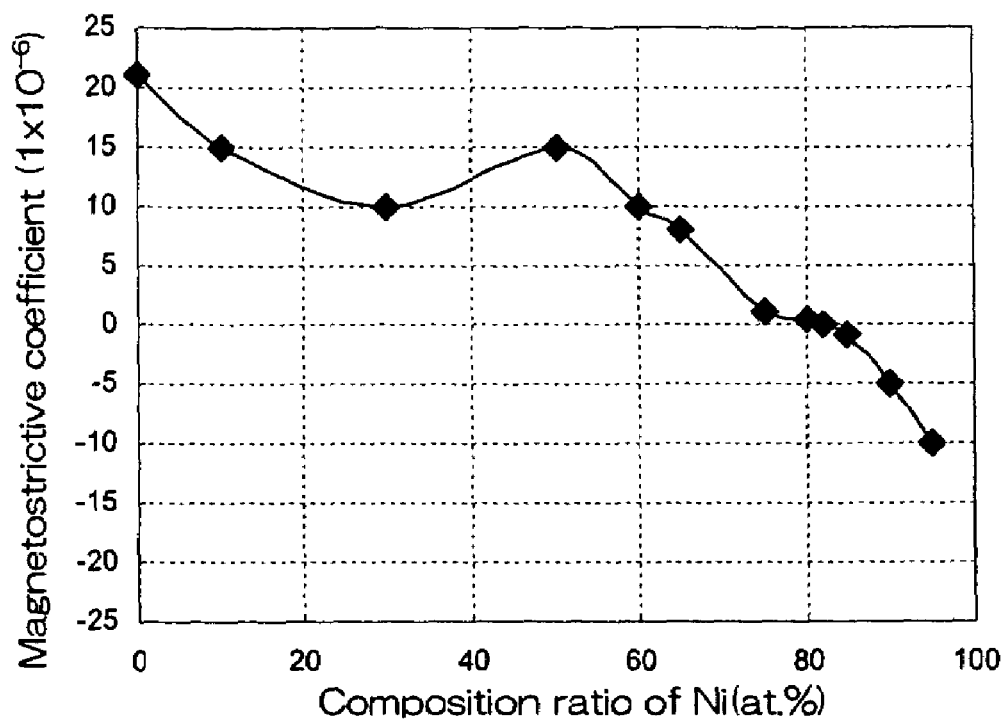
FIG. 3 is a graph showing the relationship between the composition ratio (atomic percent) of Ni and the magnetostrictive coefficient.

First and second portions 71, 72 are preferably composed of the same elements with different composition ratios. FIG. 3 shows the relationship between the composition ratio (atomic percent) of Ni and the magnetostrictive coefficient for pure NiFe. There is the tendency that magnetostriction has a large positive value when the composition ratio of Ni is small, and that magnetostriction decreases when the composition ratio of Ni increases. The aforementioned range of the magnetostrictive coefficient corresponds to the composition ratio of Ni that is 80% or less. In this way, it is possible to form first and second portions 71, 72 such that they have different magnetostrictive coefficients by using a metal or an alloy in different composition ratios as the main component. Specific instances of composition ratios will be explained later in the examples. It should be noted that the relationship between the composition ratio and magnetostriction is known and can be found in advance for each material and each alloy.

Figure 11:
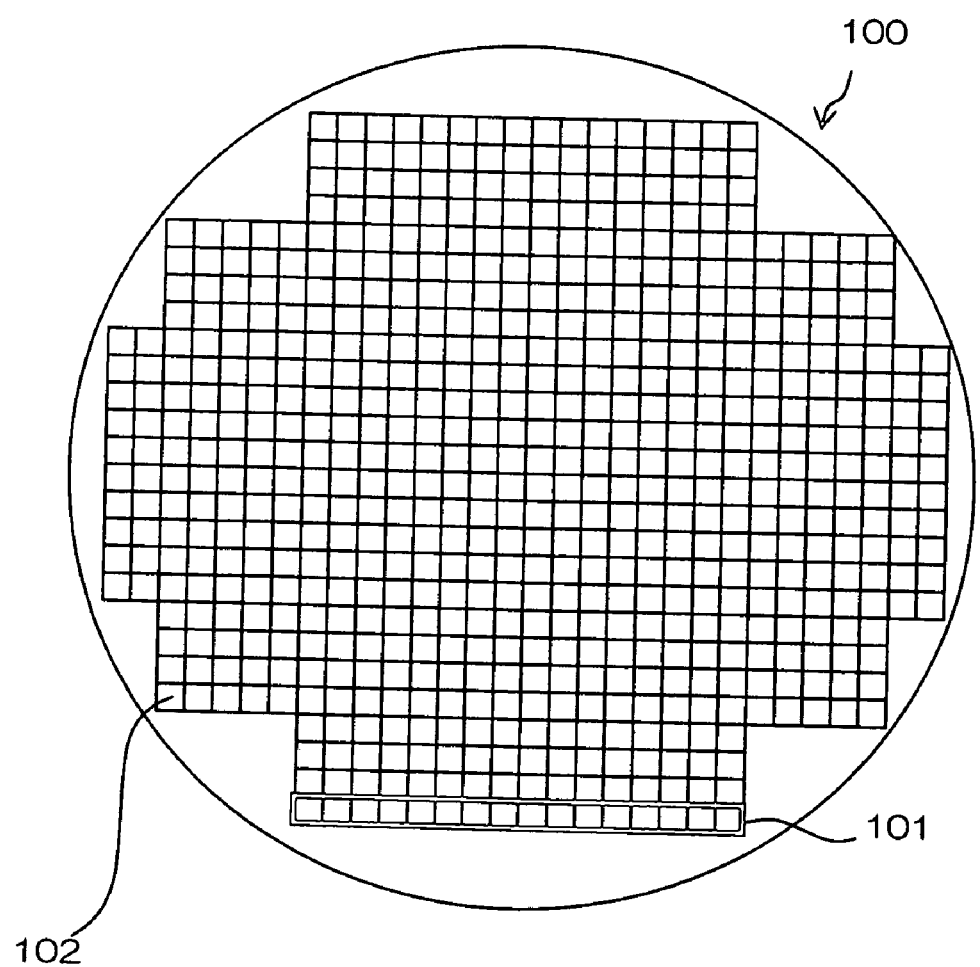
FIG. 11 is a plan view of a wafer associated with manufacturing a thin-film magnetic head according to the present invention.

Next, the mechanism of the present invention will be described. In order to produce a slider having a thin-film magnetic head, many thin-film magnetic transducers 102, from which thin-film magnetic heads are manufactured, are formed on wafer 100 by a thin-film deposition technique, as shown in FIG. 11. Next, wafer 100 is diced into bars 101 that have thin-film magnetic transducers 102 in a row, then bar 101 is polished so that ABS is formed. Thereafter, bar 101 is diced into pieces of sliders each of which is provided with thin-film magnetic head 1. A multi-layer structure starting with the substrate to protective layer 14 is formed in the process of depositing thin films, as described above. It is known that residual in-plane stress is caused in the thin films when they are deposited, as stated, for example, in Japanese Patent Laid-open Publication No. 134615/99. The in-plane stress is sequentially released when the wafer is diced into bars and then into sliders. Since in-plane stress is also caused in protective layer 14 as compressive stress when it is deposited, protective layer 14 projects out from ABS to the side of a recording medium, as indicated by broken line 15 in FIG. 1, when the in-plane stress is released.

Portions near protective layer 14 are affected by protective layer 14 that projects out, because protective layer 14 has a relatively large thickness of approximately 30 μm. Upper shield layer 7 is also forced to extend outwardly by protective layer 14, and is deformed in the direction that is indicated by the white arrow in FIGS. 1, 2B. The direction of magnetization of first portion 71 is aligned in the direction of deformation (strain), as indicated by the arrows in FIG. 2B, due to the effect of the above-mentioned positive magnetostriction of first portion 71. Since the deformation is maintained over a long period throughout the life of the slider, first portion 71, which is actually made of soft magnetic material, behaves as if it were made of hard magnetic material. In other words, first portion 71 is less magnetized in random directions by the external deformation or by the external magnetic field, as if an axis along which first portion 71 is easily magnetized were generated in the direction of the white arrow in FIG. 2B. As a result, MR element 5, which is formed under first portion 71 with respect to the direction of stacking, is also less affected by the variation in magnetization of first portion 71, leading to stable output characteristics.

MR element 5 is more influenced by first portion 71 than second portion 2 which is more distant from MR element 5. If second portion 72 has about the same magnetostrictive coefficient as first portion 71, then second portion 72 is also magnetized by the magnetostriction effect, because it is also deformed. As a result, the entire magnetization state of upper shield layer 7 is altered and a large magnetic field is applied to MR element 5. Since the direction of the magnetic field that is applied MR element 5 is the same as the direction of the magnetization of free layer 53 that is generated by the external magnetic field, too large a magnetic field from second portion 72 may have an adverse effect on the output of MR element 5. Accordingly, it is preferable that the magnetostriction of second portion 72 is smaller than that of first portion 71, and it is more preferable that the magnetostriction of second portion 72 is equal to or close to 0, as already mentioned.

As for the shape of recess 26, it is essential that it is lower than the surroundings. If recess 26 has such a shape, MR element 5 can be easily influenced by first portion 71, which has stable magnetic characteristics, by filling recess 26 with first portion 71. In other words, the influence of second portion 72 having relatively unstable magnetic characteristics can be easily excluded. It is preferable that SSD/L1, which is the ratio of depth SSD of recess 26 (the difference in height between the top surface of upper gap layer 6 above MR element 5 and the flat surface of gap layer 6 beside MR element 5) to the smallest distance L1 between opposing surfaces 25 of upper gap layer 6 above MR element 5, is set to 0.3 or more. Such a configuration allows sufficient spacing between MR element 5 and second portion 72, and ensures that first portion 71 has a certain volume, further enhancing the above-mentioned effect. It should be noted that the entire part of recess 26 is not necessarily filled with first portion 71, and if at least the portion just above MR element 5 is covered by first portion 71, the minimum required effect can be achieved.

Figure 4A:
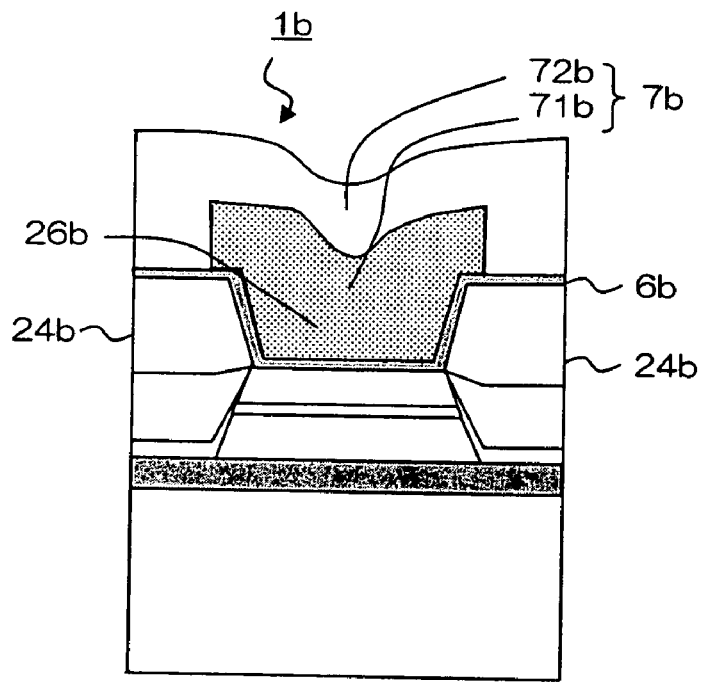
FIG. 4A is a side view showing variation of the thin-film magnetic head in the first embodiment of the present invention.
Figure 4B:
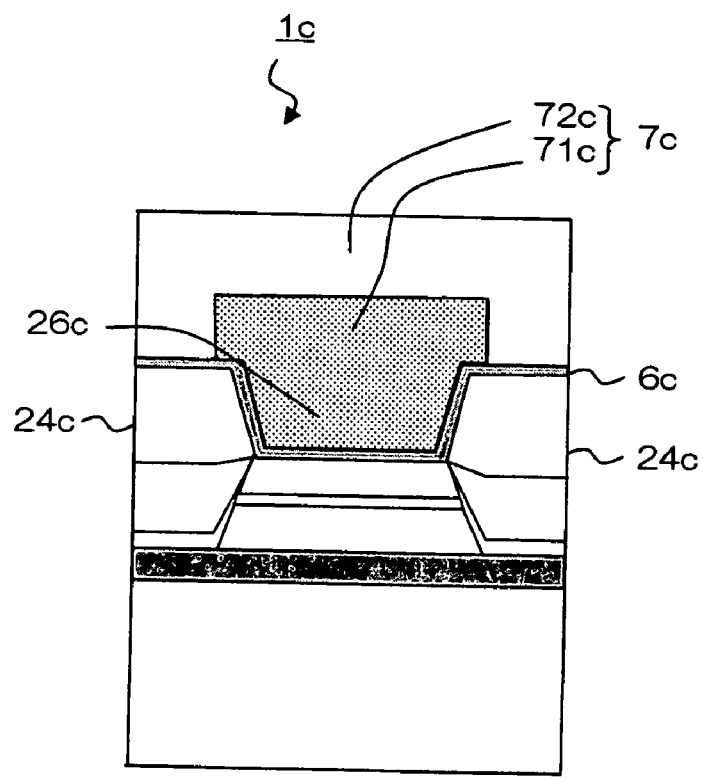
FIG. 4B is a side view showing other variation of the thin-film magnetic head in the first embodiment of the present invention.
Figure 4C:
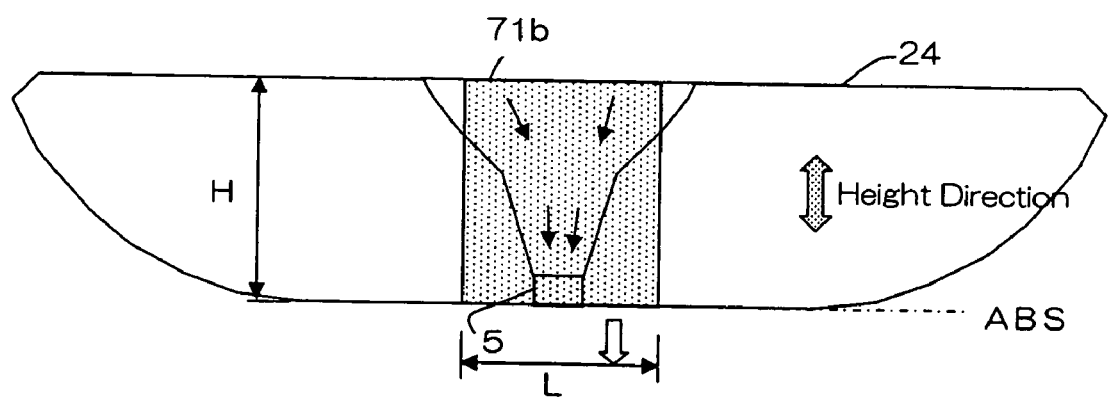
FIG. 4C is a partial plan view showing the location near the MR element and lead electrodes shown in FIGS. 4A and 4B.

First portion 71 may also cover a part of upper gap layer 6b that is adjacent to recess 26b, as shown in FIG. 4A. In this case, first portion 71b may extend to fill recess 26b while forming a pit above recess 26b. Alternatively, recess 26c may have a square section above recess 26c, as shown in FIG. 4B. FIG. 4C is a partial plan view showing the location near the MR element and the lead electrodes that are shown in FIGS. 4A and 4B. Upper gap layer 6 and second portion 27b are omitted in the figure. In these cases, it is preferable that dimension H in the height direction ranges between 1.5 times and 200 times dimension L, and more preferably ranges between 5 times and 200 times dimension L.

The Second Embodiment

Next, the second embodiment of a thin-film magnetic head of the present invention will be described. Since this embodiment is the same as the first embodiment except for the configurations of the first portion and the lead electrodes, the description will focus on the configurations of the first portion and the lead electrodes.

Figure 5A:
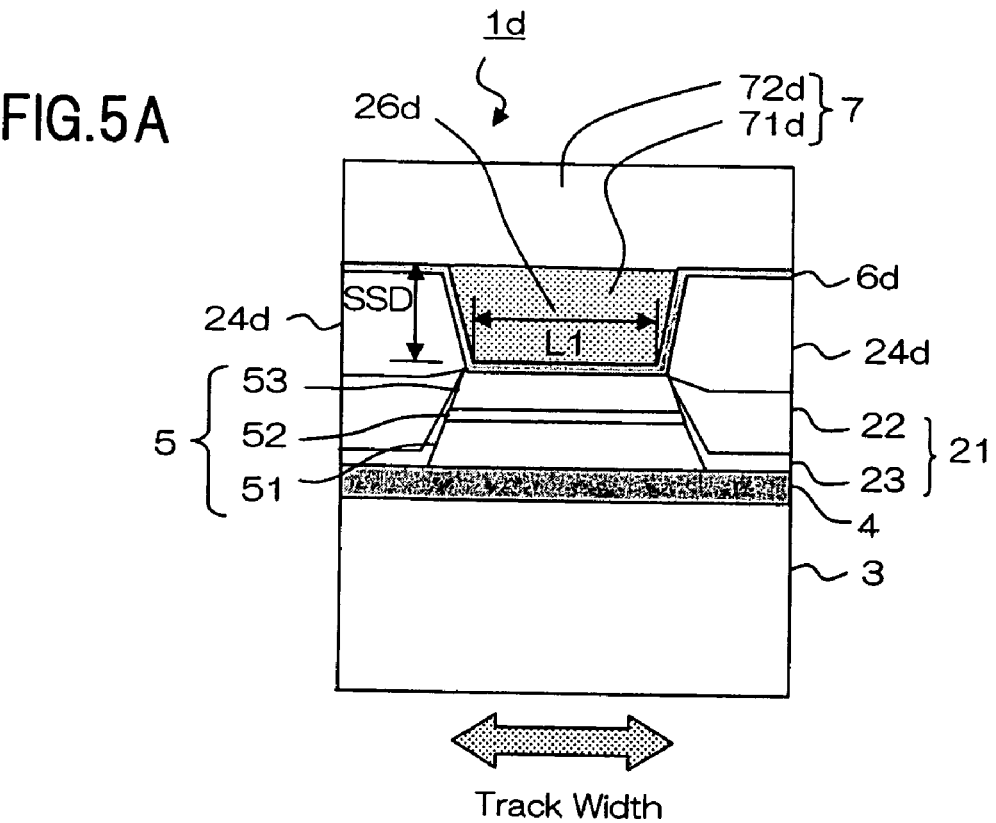
FIG. 5A is a side view showing a thin-film magnetic head in the second the embodiment of the present invention, viewed from an air bearing surface.
Figure 5B:
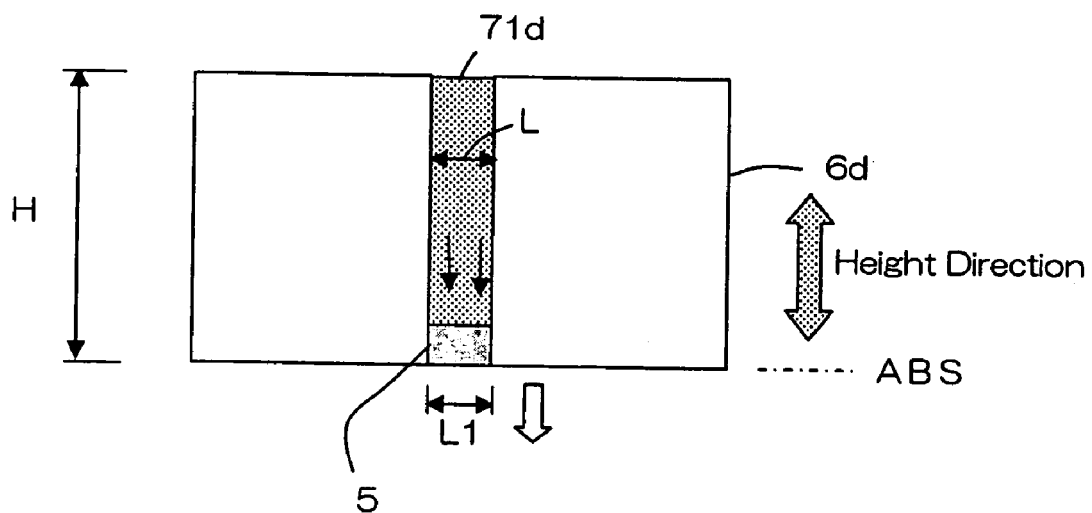
FIG. 5B is a partial plan view showing the location near the MR element and lead electrodes in the thin-film magnetic head shown in FIG. 5A.

FIG. 5A is a side view of a thin-film magnetic head, viewed from ABS. FIG. 5B is a partial plan view showing the location near the MR element and the lead electrodes. Upper shield layer 7d includes first portion 71d and second portion 72d. First portion 71d is formed such that it fills only recess 26d and extends in approximately the same cross section along the height direction. This configuration corresponds to the configuration of lead electrodes 24d in which the electrodes extend along the height direction with approximately the same spacing therebetween. Such a configuration in which the first portion 71d is elongate in the height direction allows generation of the shape-based anisotropic effect in the height direction. This shape-based anisotropic effect, in combination with the magnetostriction effect, facilitates the magnetization of first portion 71d in the direction that is indicated by the white arrow in FIG. 5B. In order to enhance the shape-based anisotropic effect, it is preferable that dimension H in the height direction ranges between 1.5 times and 200 times dimension L1, and more preferably ranges between 5 times and 200 times dimension L1. First portion 71d, similar to the first embodiment, has positive magnetostriction. The magnetostrictive coefficient may be in the same range as in the first embodiment. In addition, ratio SSD/L1, which is the ratio of depth SSD of recess 26d to dimension L1, is preferably 0.3 or more for the same reason as described for the first embodiment.

The Third Embodiment

Next, the third embodiment of a thin-film magnetic head of the present invention will be described. Since this embodiment is the same as the first embodiment except for the configurations of the first portion and the lead electrodes, the description will focus on the configurations of the first portion and the lead electrodes.

Figure 6A:
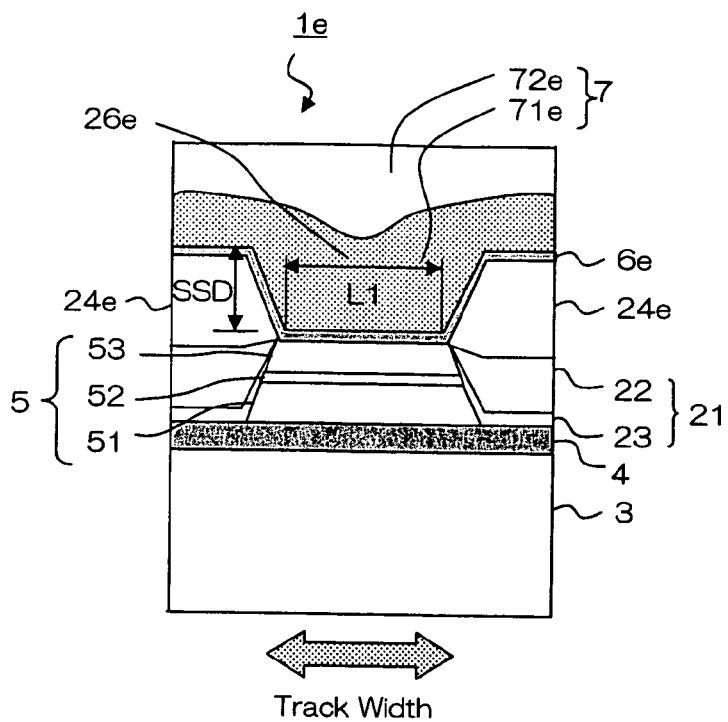
FIG. 6A is a side view showing a thin-film magnetic head in the third embodiment of the present invention, viewed from the air bearing surface.
Figure 6B:
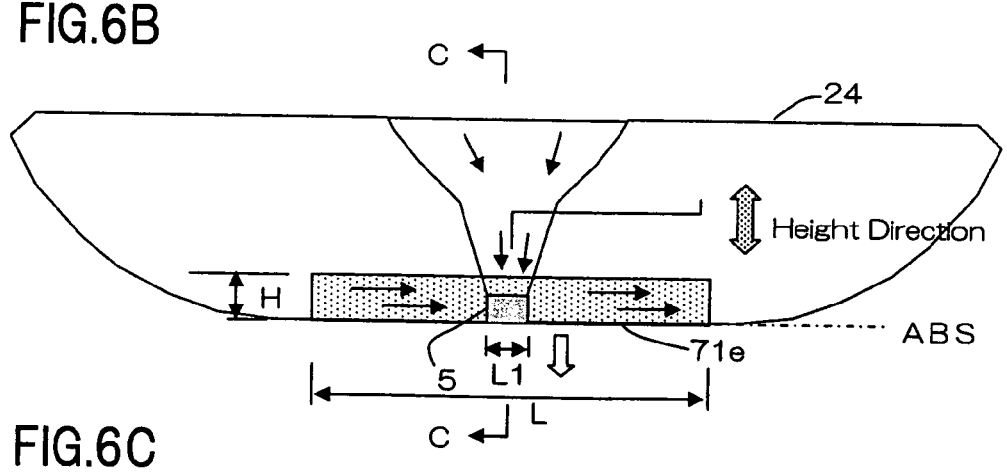
FIG. 6B is a partial plan view showing the location near the MR element and the lead electrodes in the thin-film magnetic head shown in FIG. 6A.
Figure 6C:
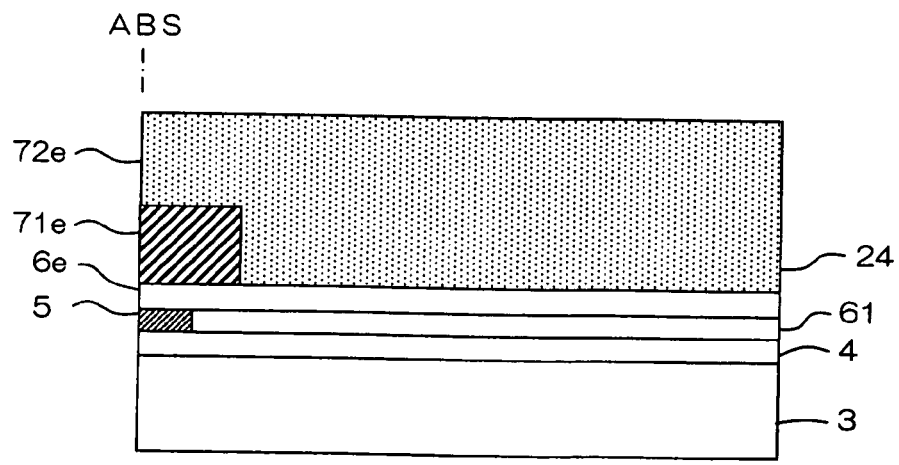
FIG. 6C is a sectional view taken along line C-C in FIG. 6B.

FIG. 6A is a side view of a thin-film magnetic head, viewed from ABS. FIG. 6B is a partial plan view showing the location near an MR element and lead electrodes. FIG. 6C is a sectional view taken along line C-C in FIG. 6B. A pair of lead electrodes 24e are provided on both sides of MR element 5 with respect to the track width direction. Upper gap layer 6e extends to cover the opposing surfaces of the pair of lead electrodes 24e, as well as MR element 5. As a result, recess 26e is formed between the opposing surfaces of upper gap layer 6e. Upper shield layer 7e has first portion 71e and second portion 72e. First portion 71e, different from the first and second embodiments, extends along the track width direction in approximately the same cross section, so that the dimension in the track width direction is larger than the dimension in the height direction. Specifically, first portion 71e extends in the track width direction across recess 26e, from one side with respect to the track width direction of upper gap layer 6e to the other side of upper gap layer 6e, covering part of recess 26e. First portion 71e has negative magnetostriction with a magnetostrictive coefficient of $-0.5\times 10^{-6}$ or lower. In order to enhance the shape-based anisotropic effect, it is preferable that dimension L in the track width direction ranges between 1.5 times and 200 times dimension H, and more preferably ranges between 5 times and 200 times dimension H.

The present embodiment makes use of the negative magnetostriction effect. Specifically, as protective layer 14 projects, and thereby first portion 71e projects from ABS toward a recording medium, the direction of magnetization of first portion 71e tends to be aligned in the direction that is perpendicular to the direction of projecting, or in the direction of the longitudinal axis of first portion 71e, due to the negative magnetostriction effect. Further, since the longitudinal axis of first portion 71e lies in the direction that is perpendicular to the direction of projecting, the direction of magnetization, similar to the second embodiment, tends to be aligned in the direction of the longitudinal axis due to the shape-based anisotropic effect.

In this way, an axis along which the first portion is easily magnetized can positively be generated in a desired direction by aligning the direction of magnetization that is caused by magnetostriction, which depends on whether the magnetostriction is positive or negative, and the axis along which the shape-based anisotropic effect arises.

Next, the basis of the above-mentioned absolute value of the magnetostrictive coefficient will be described based on examples.

EXAMPLE 1

Seven types of materials having different magnetostrictive coefficients ranging from $10\times 10^{-6}$ to $-3\times 10^{-6}$ were selected, and seven kinds of samples were manufactured in which the recess and the first portion have the configuration shown in FIGS. 4A and 4C. Next, the outputs of the MR elements were measured while applying external magnetic field to each sample. Specifically, after MR element 5, lead electrodes 24 and upper gap layer 6 were deposited, first portion 71b was formed by sputtering, then the second portion was formed on first portion 71b. In FIG. 4C, the upper gap layer and the second portion were omitted. Spacing L of the lead electrodes was 0.12 μm, dimension H in the height direction was 18 μm, and depth SSD was 0.1 μm. The first portion, which was formed as shown in FIG. 4C, had a width of 3 μm, a length of 18 μm in the height direction, and a film thickness of 0.15 μm.

Figure 7:
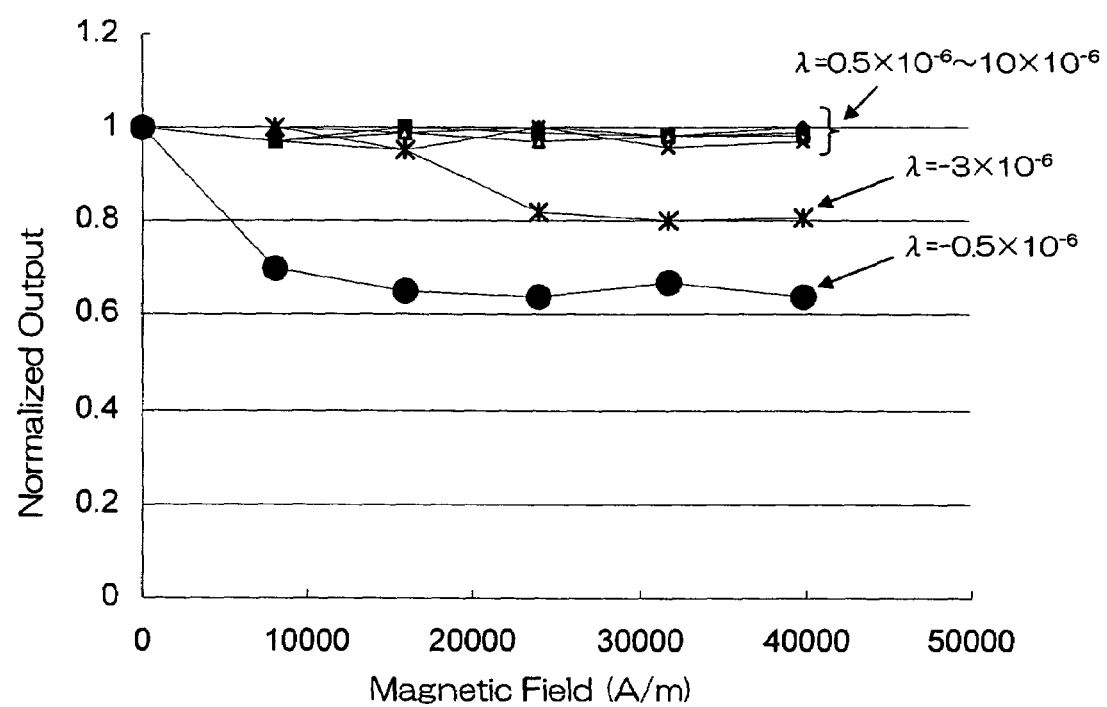
FIG. 7 is a graph showing the relationship between the magnetostrictive coefficient and the output of MR elements.

FIG. 7 shows the relationship between the magnetostrictive coefficient A and the normalized output. The result is shown in FIG. 7 and TABLE1. The direction of magnetization tends to align in the track width direction for the samples having a negative magnetostrictive coefficient. However, since the first portion is elongate in the height direction near the MR element, the shape-based anisotropic effect tends to act in the height direction. Therefore, it is thought that the magnetization of the shield layer became unstable, which disturbed the bias magnetic field and made the MR element susceptible to the external magnetic field, resulting in variation in the output of the MR element. On the contrary, the variation of the output of the MR element was within 5% for the samples having a magnetostrictive coefficient between $0.5\times 10^{-6}$ to $10\times 10^{-6}$, which leads to good results.

TABLE 1

| Ext. Magnetic Field(A/m) | Magneostrictive Coeff. | | | | | | |
|---|---|---|---|---|---|---|---|
| | $10 \times 10^{-6}$ | $5 \times 10^{-6}$ | $3 \times 10^{-6}$ | $1 \times 10^{-6}$ | $0.5 \times 10^{-6}$ | $-0.5 \times 10^{-6}$ | $-3 \times 10^{-6}$ |
| 0 | 1 | 1 | 1 | 1 | 1 | 1 | 1 |
| 7960 | 0.97 | 0.97 | 0.97 | 1 | 0.97 | 1 | 0.7 |
| 15920 | 0.99 | 0.99 | 1 | 0.99 | 0.95 | 0.95 | 0.65 |
| 23880 | 1 | 1 | 0.99 | 0.97 | 1 | 0.82 | 0.64 |
| 31840 | 0.98 | 0.98 | 0.98 | 0.98 | 0.96 | 0.8 | 0.67 |
| 39800 | 1 | 1 | 0.99 | 0.98 | 0.97 | 0.81 | 0.64 |

Figure 8:
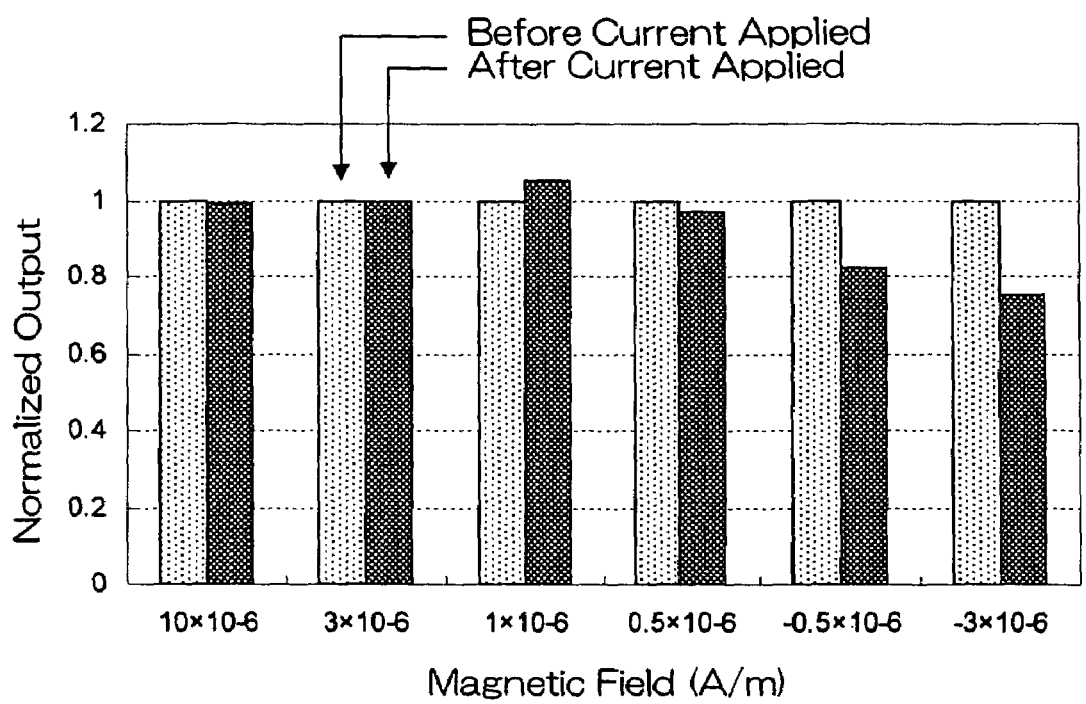
FIG. 8 is a graph showing the change in the output of MR elements before and after current is applied to the coil.

Next, similar to the above experiment, the outputs of the MR elements were measured for the samples having a magnetostrictive coefficient that ranges from $10\times 10^{-6}$ to $-3\times 10^{-6}$, while a large electric current was applied to the coil to deform the upper shield layer (write-stress resistance test). FIG. 8 shows the variation in the output of the MR elements before and after electric current is applied. The figure shows the normalized outputs of the MR elements before and after electric current is applied to the samples having different magnetostrictive coefficients. Normalization was performed for each sample, and the chart shows that the sample which experienced a smaller change in the output before and after the electric current was applied is less affected by the external magnetic field. It was confirmed from the above that if the magnetostrictive coefficient is $0.5\times 10^{-6}$ or more, the output of the MR element varies within a sufficiently small range and the MR element is not affected by the external deformation. From the above, it is preferable that the magnetostrictive coefficient is $0.5\times 10^{-6}$ or more for embodiments that utilize positive magnetostriction. In addition, although the magnetostrictive coefficient was tested up to $10\times 10^{-6}$ in this experiment, the upper limit of the magnetostrictive coefficient is considered to be $50\times 10^{-6}$.

When a negative magnetostrictive coefficient is utilized as in the third embodiment, a similar effect can be achieved if the direction of magnetization due to magnetostriction and the axis of the shape-based anisotropic effect are aligned. Therefore, the preferable range of the magnetostrictive coefficient is considered to be $-0.5\times 10^{-6}$ or smaller.

EXAMPLE 2

Next, the effect of the present invention was demonstrated based on another example. First, as the case of the positive magnetostriction (Experiment 1), after the MR element, the lead electrodes, and the upper gap layer were deposited, the first portion was formed by sputtering, then the second portion was formed above the MR element. Ni75Fe25 (magnetostrictive coefficient is $1\times 10^{-6}$) was used for the first portion, and Ni82Fe18 (magnetostrictive coefficient is 0) was used for the second portion. Spacing L1 of the lead electrodes was 0.12 μm, dimension H in the height direction was 18 μm, and depth SSD was 0.1 μm. The first portion, which was formed as shown in FIG. 4C, had a width of 3 µm, a length of 18 µm in the height direction, and a film thickness of 0.15 µm.

Similarly, as in the case of the negative magnetostriction (Experiment 2), after the MR element, the lead electrodes, and the upper gap layer were deposited, the first portion was formed by sputtering, then the second portion was formed above the MR element. Ni90Fe10 (magnetostrictive coefficient is $-2\times10^{-6}$) was used for the first portion, and Ni82Fe18 (magnetostrictive coefficient is 0) was used for the second portion. The recess was formed in the same shape as in Experiment 1. The first portion, which was formed as shown in FIG. 6B, had a width of 15 µm, a length of 3 µm in the height direction, and a film thickness of 0.15 µm.

Further, as a comparative example, a sample that uses Ni82Fe18 (magnetostrictive coefficient is 0) for the entire upper shield was prepared. The recess was formed in the same shape as in Experiments 1 and 2.

Figure 9:
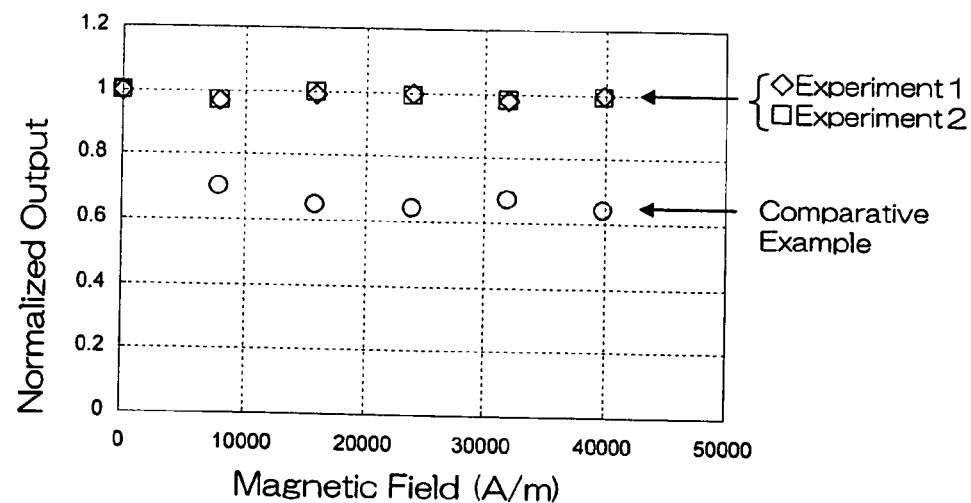
FIG. 9 is a graph showing the relationship between the magnetostrictive coefficient and the output of MR elements.
Figure 10:
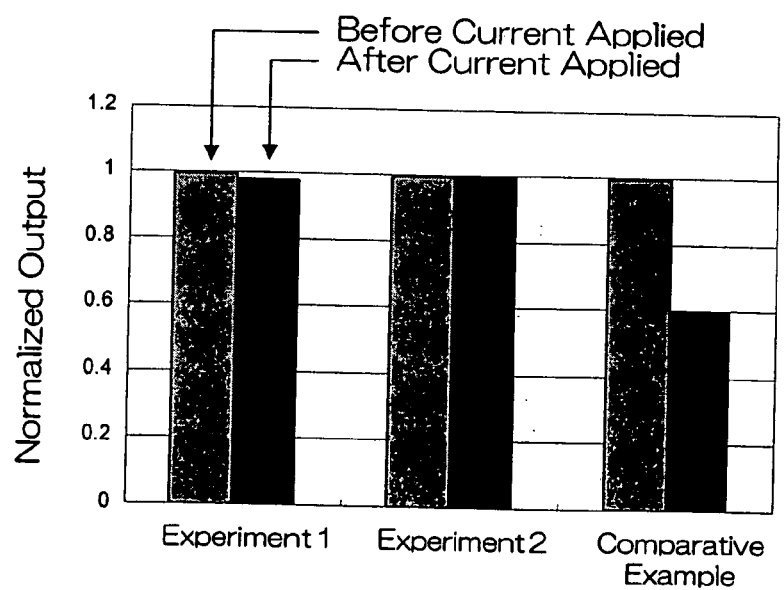
FIG. 10 is a graph showing the change in the output of MR elements before and after current is applied to the coil.

The outputs of the MR elements in relation to the external magnetic field and current were measured. The result of the measurement is shown in FIGS. 9, 10. These figures are made in the same format as FIGS. 7, 8. The effect of the present invention was confirmed for both the external magnetic field and the external deformation in both the positive and the negative case.

The thin-film magnetic head of the present invention is described for a CIP-type GMR element that has lead electrodes on both sides of the MR element. However, the present invention is not limited to the thin-film magnetic head of the above type. As is apparent from the above description, the present invention can be applied to magnetic field sensors that detect the magnitude of an external magnetic field based on the resistance to sense current that varies in accordance with the external magnetic field. Specifically, the present invention can be applied to AMR (Anisotropic Magneto-Resistive effect) elements, CPP-type GMR (Giant Magneto-Resistive effect) elements, as well as TMR (Tunnel Magneto-Resistive effect) elements. In the case of a CPP type GMR element or a TMR element, upper and lower shield layers also function as lead layers to supply sense current, and a metal layer is formed above the MR element. Accordingly, lead layers are not arranged on both sides of the element with respect to the track width direction, so that the metal layer in a CPP type element is formed in a flatter shape compared to the upper gap layer in a CIP-type element. However, it is also possible to obtain a similar effect in this case by forming the first portion such that it extends in an elongate shape above the top surface of the metal layer from the location that is above the MR element. In this case, similar to the third embodiment, the first portion may have a longer dimension in the track width direction. Specifically, the first portion may be provided on the top surface of the metal layer, and may extend in the track width direction such that it covers a part of one of the pair of bias layers, the top surface of the MR element, and a part of the other bias layer. The shape of the first portion, in particular the aspect ratio, may be formed in a similar manner to the first portion which is described above. In this way, the present invention can also be carried out in the same manner for a CPP-type GMR element or a TMR element.

Figure 12:
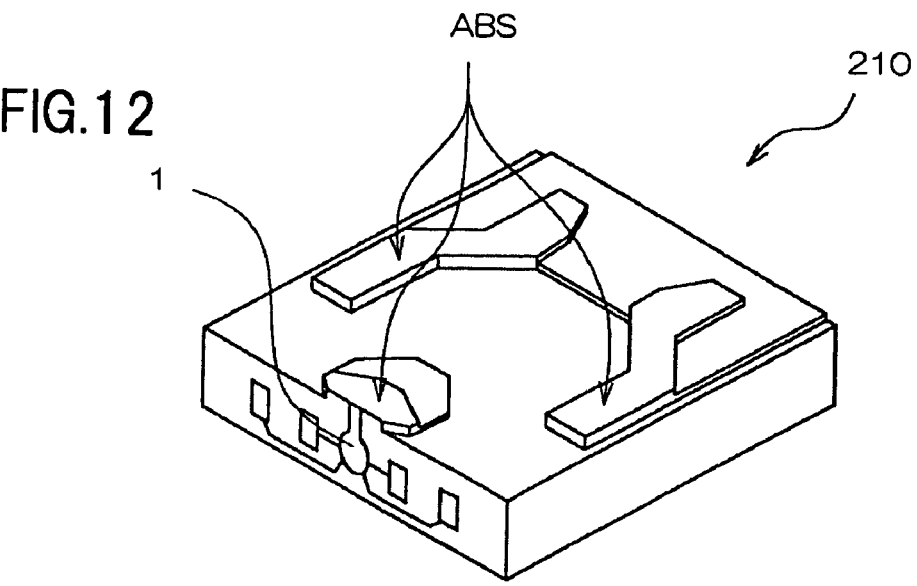
FIG. 12 is a perspective view illustrating a slider, included in a head gimbal assembly, which incorporates a thin-film magnetic head according to the present invention.
Figure 12:
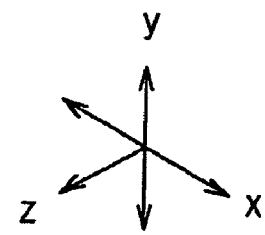

Next, explanation will be made regarding a wafer for fabricating a thin-film magnetic head described above. FIG. 11 is a schematic plan view of a wafer. Wafer 100 has a plurality of thin-film magneto-electric transducers 102 which al least includes a stacked structure from lower shield layer 3 to upper shield layer 7. Wafer 100 is diced into bars 101, in which a plurality of thin-film magneto-electric transducers 102 are formed in a row. Bar 101 serves as a work unit in the process of forming ABS. Bar 101 is diced into the above-mentioned sliders each having a thin-film magnetic head after polishing. Dicing margins, not shown, are provided in wafer 100 to dice wafer 100 into bars 101 and sliders. Explanation next regards a head gimbal assembly and a hard disk drive that uses the thin-film magnetic head. Referring to FIG. 12, slider 210 which is included in the head gimbal assembly will be described first. In a hard disk drive, slider 210 is arranged opposite to a hard disk, which is a rotationally-driven disciform storage medium. Slider 210 has a substantially hexahedral form. One of the six surfaces of slider 210 forms ABS, which is positioned opposite to the hard disk. When the hard disk rotates in the z direction shown in FIG. 12, an airflow which passes between the hard disk and slider 210 creates a dynamic lift which is applied to slider 210 downward in the y direction of FIG. 12. Slider 210 is configured to lift up from the surface of the hard disk with this dynamic lift effect. In proximity to the trailing edge (the end portion at the lower left in FIG. 12) of slider 210, which is on the outlet side of the airflow, thin-film magnetic head 1 is formed.

Figure 13:
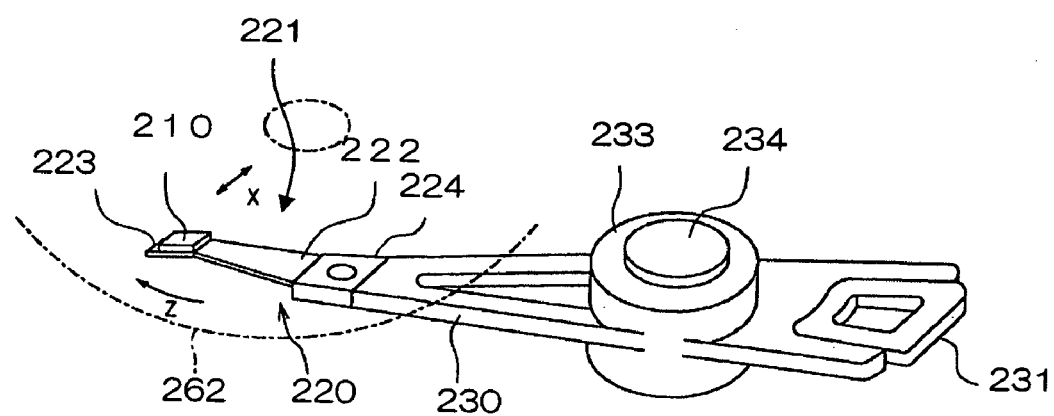
FIG. 13 is a perspective view illustrating a head arm assembly including the head gimbal assembly which incorporates a thin-film magnetic head according to the present invention.

Referring to FIG. 13, head gimbal assembly 220 that has the thin-film magnetic head will be explained next. Head gimbal assembly 220 is provided with slider 210, and suspension 221 for resiliently supporting slider 210. Suspension 221 has; load beam 222 in the shape of a flat spring and made of, for example, stainless steel; flexure 223 attached to one end of load beam 222, and to which slider 210 is fixed, while providing an appropriate degree of freedom to slider 210; and base plate 224 provided on the other end of load beam 222. The portion of flexure 223 to which slider 210 is attached has a gimbal section for maintaining slider 210 in a fixed orientation. The arrangement in which a head gimbal assembly 220 is attached to a single arm 230 is called a head arm assembly. Arm 230 moves slider 210 in the transverse direction x with regard to the track of hard disk 262. One end of arm 230 is attached to base plate 224. Coil 231, which constitutes a part of the voice coil motor, is attached to the other end of arm 230. In the intermediate portion of arm 230, bearing section 233 which has shaft 234 to rotatably hold arm 230 is provided. Arm 230 and the voice coil motor to drive arm 230 constitutes an actuator.

Figure 14:
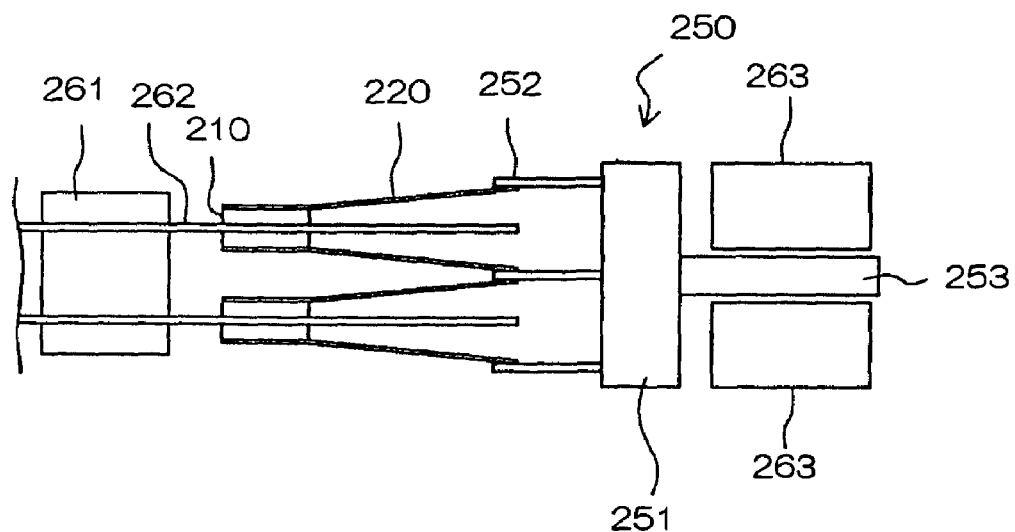
FIG. 14 is an explanatory diagram illustrating the essential part of a hard disk drive which incorporates thin-film magnetic heads according to the present invention.
Figure 15:
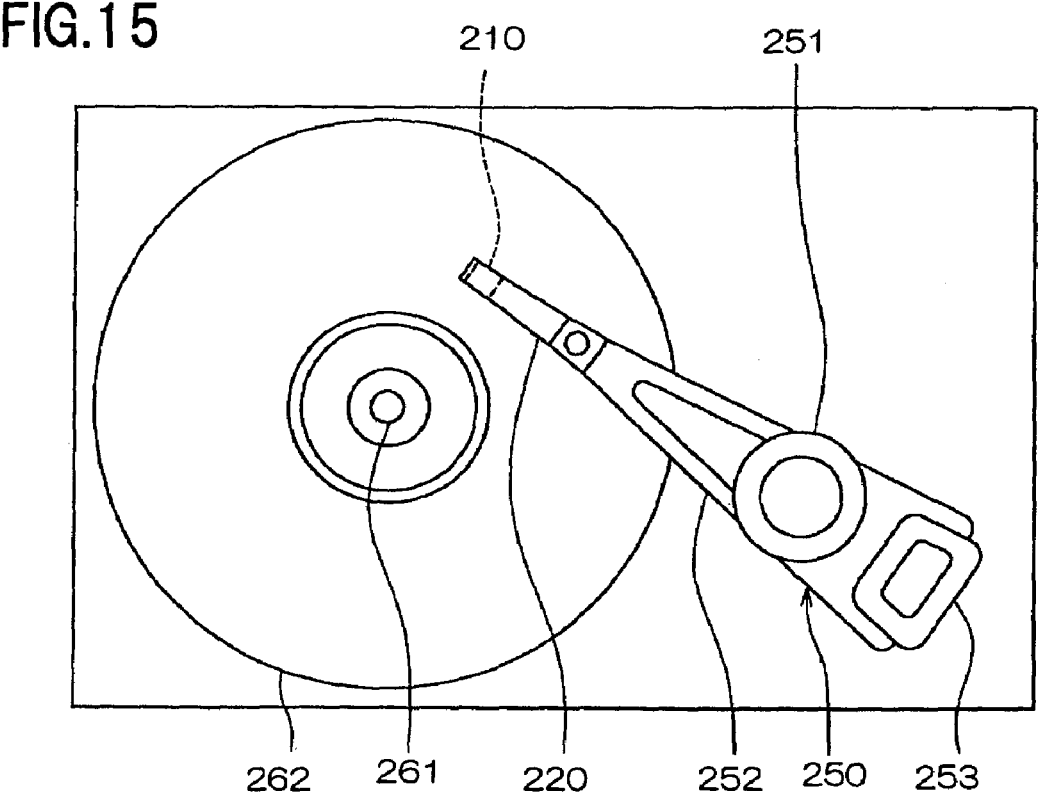
FIG. 15 is a plan view of a hard disk drive which incorporates thin-film magnetic heads according to the present invention.

Referring to FIG. 14 and FIG. 15, a head stack assembly and a hard disk drive that use the thin-film magnetic head as a head element will be explained next. The arrangement in which a head gimbal assembly 220 is attached to the respective arm of a carriage having a plurality of arms is called a head stack assembly. FIG. 14 is an explanatory diagram illustrating an essential part of a hard disk drive, and FIG. 15 is a plan view of the hard disk drive. Head stack assembly 250 has carriage 251 provided with a plurality of arms 252. A plurality of head gimbal assemblies 220 are attached to a plurality of arms 252 such that head gimbal assemblies 220 are arranged apart from each other in the vertical direction. Coil 253, which constitutes a part of the voice coil, is attached to carriage 251 on the side opposite to arms 252. The voice coil motor has permanent magnets 263 which are arranged in positions opposite to each other interposing coil 253 of head stack assembly 250 therebetween.

Referring to FIG. 15, head stack assembly 250 is installed in the hard disk drive. The hard disk drive has a plurality of hard disks connected to spindle motor 261. Two sliders 210 are arranged per each hard disk 262 at positions opposite to each other interposing hard disk 262 therebetween. Head stack assembly 250 and the actuator, except for sliders 210, work as a positioning device. They carry sliders 210 and work to position sliders 210 relative to hard disks 262. Sliders 210 are moved by the actuator in the transverse direction with regard to the tracks of hard disks 262, and positioned relative to hard disks 262. The thin-film magnetic head 1 that is contained in slider 210 records information to hard disk 262 with a write head, and reads information recorded in hard disk 262 with a read head.

While the preferred embodiment of the present invention has been presented and described in detail, it should be understood that a variety of alterations and modifications can be made without departing from the spirit or scope of the appended claims.

What is claimed is:

1. A magnetic field sensor, comprising:
a magnetic field detecting element that detects a magnitude of an external magnetic field based on an electric resistance of said magnetic field detecting element to sense current, the electric resistance being varied in accordance with the external magnetic field;
an upper shield layer that is formed to cover said magnetic field detecting element; and
a protective layer that is formed above said upper shield layer with respect to a direction of stacking,
wherein said upper shield layer includes a first portion at least part of which covers a top surface of said magnetic field detecting element, and a second portion that covers said first portion, and,
wherein said first portion has a larger absolute value of magnetostriction than said second portion;
wherein said first portion has a positive value of magnetostriction, and extends in an approximately same cross section in a height direction of said magnetic field detecting element, and wherein said first portion is formed such that a dimension of said first portion in the height direction ranges between 1.5 times 200 times a dimension of said magnetic field detecting element in a track width direction,
wherein said magnetic field detecting element comprises a magneto-resistive element which comprises a first ferromagnetic layer whose direction of magnetization is fixed with respect to the external magnetic field, a nonmagnetic layer, and a second ferromagnetic layer whose direction of magnetization varies in accordance with the external magnetic field, and
further comprising:
a pair of bias layers for applying a bias magnetic field to said second ferromagnetic layer, said pair of bias layers being arranged on both sides of said magneto-resistive element with respect to the track width direction;
a pair of lead electrodes for supplying the sense current to said magneto-resistive element, wherein each of said pair of lead electrodes covers at least a part of the corresponding bias layer; and
an upper gap layer that is configured to cover surfaces of said pair of lead electrodes that are opposite to each other and said magneto-resistive element, said upper gap layer forming a recess between said pair of lead electrodes,
wherein said first portion extends in the height direction such that said first portion fills only the recess.

2. A magnetic field sensor, comprising:
a magnetic field detecting element that detects a magnitude of an external magnetic field based on an electric resistance of said magnetic field detecting element to sense current, the electric resistance being varied in accordance with the external magnetic field;
an upper shield layer that is formed to cover said magnetic field detecting element; and
a protective layer that is formed above said upper shield layer with respect to a direction of stacking,
wherein said upper shield layer includes a first portion at least part of which covers a top surface of said magnetic field detecting element, and a second portion that covers said first portion, and,
wherein said first portion has a larger absolute value of magnetostriction than said second portion;
wherein said first portion has a positive value of magnetostriction, and extends in an approximately same cross section in a height direction of said magnetic field detecting element, and wherein said first portion is formed such that a dimension of said first portion in the height direction ranges between 1.5 times 200 times a dimension of said magnetic field detecting element in a track width direction,
wherein said magnetic field detecting element comprises a magneto-resistive element which comprises a first ferromagnetic layer whose direction of magnetization is fixed with respect to the external magnetic field, a nonmagnetic layer, and a second ferromagnetic layer whose direction of magnetization varies in accordance with the external magnetic field, and
further comprising:
a pair of bias layers for applying a bias magnetic field to said second ferromagnetic layer, said pair of bias layers being arranged on both sides of said magneto-resistive element with respect to the track width direction; and
a metal layer that is formed to cover at least a part of the pair of bias layers and said magneto-resistive element,
wherein said upper shield layer supplies the sense current to said magneto-resistive element, and
wherein said first portion extends above said metal layer from above said magneto-resistive element in the height direction.

3. A magnetic field sensor, comprising:
a magnetic field detecting element that detects a magnitude of an external magnetic field based on an electric resistance of said magnetic field detecting element to sense current, the electric resistance being varied in accordance with the external magnetic field;
an upper shield layer that is formed to cover said magnetic field detecting Element; and
a protective layer that is formed above said upper shield layer with respect to a direction of stacking,
wherein said upper shield layer includes a first portion at least part of which covers a top surface of said magnetic field detecting element, and a second portion that covers said first portion,
wherein said first portion has a larger absolute value of magnetostriction than said second portion,
wherein said first portion has a negative magnetostriction value, and extends in an approximately same cross section in a track width direction of said magnetic field detecting element, and wherein said first portion is formed such that a dimension of said first portion in the track width direction ranges between 1.5 times 200 times a dimension of said magnetic field detecting element in a height direction,
wherein said magnetic field detecting element comprises a magneto-resistive element which comprises a first ferromagnetic layer whose direction of magnetization is fixed with respect to the external magnetic field, a nonmagnetic layer, and a second ferromagnetic layer whose direction of magnetization varies in accordance with the external magnetic field, and
further comprising:
a pair of bias layers for applying a bias magnetic field to said second ferromagnetic layer, said pair of bias layers being arranged on both sides of said magneto-resistive element with respect to the track width direction;

a pair of lead electrodes for supplying the sense current to said magneto-resistive element, wherein each of said pair of lead electrodes covers at least a part of the corresponding bias layer; and an upper gap layer that is configured to cover surfaces of said pair of lead electrodes that are opposite to each other and said magneto-resistive element, said upper gap layer forming a recess between said pair of lead electrodes, wherein said first portion extends in the track width direction such that said first portion fills a part of said upper gap layer and a part of said recess.

4. The magnetic field sensor according to claim 3, wherein an absolute value of magnetostrictive coefficient of said first portion is equal to or greater than $0.5 \times 10^6$.

5. The magnetic field sensor according to claim 4, wherein said first and second portions essentially consist of any one of nickel, iron, cobalt, or compound containing nickel, iron, or cobalt.

6. The magnetic field sensor according to claim 5, wherein said first and second portions are composed of same elements having different composition ratios.

7. A thin-film magnetic head comprising the magnetic field sensor according to claim 3.

8. A wafer on which at least one thin-film magnetic transducer is formed, the thin-film magnetic transducer being used to manufacture the thin-film magnetic head according to claim 7.

9. A head gimbal assembly comprising:
a slider which has the thin-film magnetic head according to claim 7, and which is configured to face a recording medium; and
a suspension for elastically supporting the slider.

10. A hard disk drive comprising:
a disk-shaped recording medium that is rotationally driven;
a slider which has the thin-film magnetic head according to claim 7, and which is arranged to face the recording medium; and
a device for supporting the slider and for positioning the slider relative to the recording medium.

11. A magnetic field sensor, comprising:
a magnetic field detecting element that detects a magnitude of an external magnetic field based on an electric resistance of said magnetic field detecting element to sense current, the electric resistance being varied in accordance with the external magnetic field;

an upper shield layer that is formed to cover said magnetic field detecting element; and a protective layer that is formed above said upper shield layer with respect to a direction of stacking, wherein said upper shield layer includes a first portion at least part of which covers a top surface of said magnetic field detecting element, and a second portion that covers said first portion, wherein said first portion has a larger absolute value of magnetostriction than said second portion, wherein said first portion has a negative magnetostriction value, and extends in an approximately same cross section in a track width direction of said magnetic field detecting element, and wherein said first portion is formed such that a dimension of said first portion in the track width direction ranges between 1.5 times 200 times a dimension of said magnetic field detecting element in a height direction, wherein said magnetic field detecting element comprises a magneto-resistive element which comprises a first ferromagnetic layer whose direction of magnetization is fixed with respect to the external magnetic field, a nonmagnetic layer, and a second ferromagnetic layer whose direction of magnetization varies in accordance with the external magnetic field, and further comprising:
a pair of bias layers for applying a bias magnetic field to said second ferromagnetic layer, said pair of bias layers being arranged on both sides of said magneto-resistive element with respect to the track width direction; and
a metal layer that is formed to cover at least a part of said pair of bias layers and said magneto-resistive element, wherein said upper shield layer supplies the sense current to said magneto-resistive element, and wherein said first portion extends above said metal layer in the track width direction such that said first portion covers a part of one of said pair of bias layers, said magneto-resistive element, and a part of the other of said pair of bias layers.

* * * * *